(12) United States Patent
Lambæk

(10) Patent No.: US 10,759,105 B2
(45) Date of Patent: Sep. 1, 2020

(54) MOULD TOOL FOR INJECTION MOULDING

(71) Applicant: LEGO A/S, Billund (DK)

(72) Inventor: Jens Stamp Lambæk, Ikast (DK)

(73) Assignee: LEGO A/S (DK)

( * ) Notice: Subject to any disclaimer, the term of this patent is extended or adjusted under 35 U.S.C. 154(b) by 368 days.

(21) Appl. No.: 15/309,766

(22) PCT Filed: May 28, 2015

(86) PCT No.: PCT/DK2015/050138
§ 371 (c)(1),
(2) Date: Nov. 8, 2016

(87) PCT Pub. No.: WO2015/180735
PCT Pub. Date: Dec. 3, 2015

(65) Prior Publication Data
US 2017/0151702 A1 Jun. 1, 2017

(30) Foreign Application Priority Data
May 28, 2014 (DK) .................................. 2014 70309

(51) Int. Cl.
*B29C 45/73* (2006.01)
*B29C 45/26* (2006.01)
*B29C 33/00* (2006.01)

(52) U.S. Cl.
CPC ...... *B29C 45/7312* (2013.01); *B29C 33/0083* (2013.01); *B29C 45/2675* (2013.01)

(58) Field of Classification Search
CPC ............ B29C 33/0083; B29C 45/2675; B29C 45/7312
See application file for complete search history.

(56) References Cited

U.S. PATENT DOCUMENTS 4,451,069 A * 5/1984 Melone ............... F16L 37/0842
285/315
5,562,935 A 10/1996 Martin
(Continued)

FOREIGN PATENT DOCUMENTS

CN 1429675 A 7/2003
EP 0580259 A1 1/1994
(Continued)

OTHER PUBLICATIONS

Danish Patent and Trademark Offices Search Report, issued in priority application No. PA 2014 70309, dated Dec. 8, 2014.
(Continued)

*Primary Examiner* — Joseph S Del Sole
*Assistant Examiner* — John Robitaille
(74) *Attorney, Agent, or Firm* — Day Pitney LLP

(57) ABSTRACT

Injection-moulding mould configured for being mounted in an injection-moulding apparatus for automated moulding of work pieces from plastics, said injection-moulding mould comprising at least two separate mould parts that are separated by a mould separation face, and wherein at least one mould part 1 is configured with an outer frame 2 in which one or more spaces is/are configured that are open relative to the mould separation face, in which is mounted at least one exchangeable mould insert 3, and wherein the exchangeable mould insert 3 has a mould cavity side that faces towards the mould separation face, which mould cavity side is provided with one or more mould cavities, and wherein, in the mould insert 3, a set of cooling channels 14 is provided and at least two pipe couplings to which there is, for each pipe coupling, configured a cooling pipe 4 being, with its first end, mounted to the pipe coupling and extending therefrom, in its longitudinal direction, from the pipe coupling and out through a channel 8 in the outer frame of (Continued)

Figure 1:
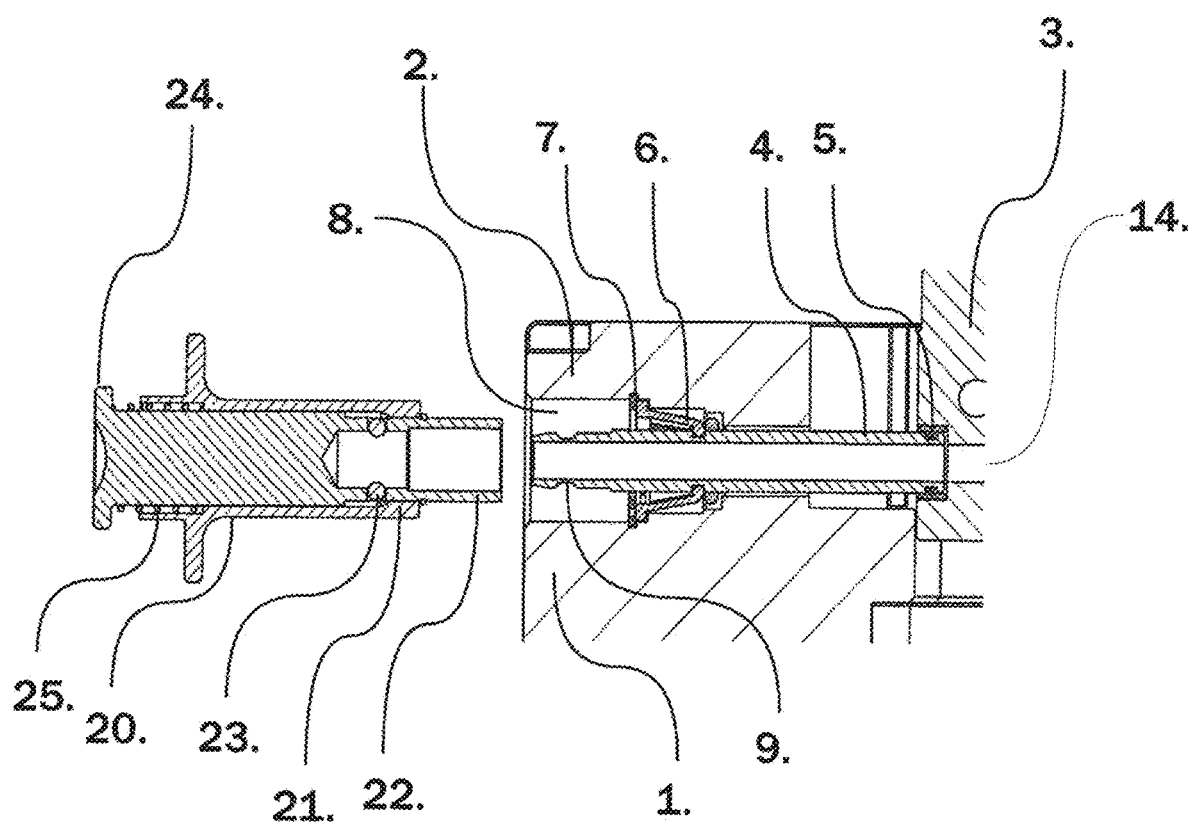

the mould part and to its other end. The cooling pipe being secured in the channel in such a manner that it cannot be shifted in the longitudinal direction thereof, it is accomplished that the pipe coupling may be configured such as to occupy only very little space in the mould insert 3.

6 Claims, 2 Drawing Sheets

(56) References Cited

U.S. PATENT DOCUMENTS

| | | | |
|---|---|---|---|
| 6,936,206 | B1 | 8/2005 | Satoh et al. |
| 2003/0150586 | A1 | 8/2003 | Matsuura et al. |
| 2006/0082148 | A1 | 4/2006 | Durieux et al. |
| 2011/0135780 | A1 | 6/2011 | Yeh et al. |

FOREIGN PATENT DOCUMENTS

| | | |
|---|---|---|
| EP | 1614516 A1 | 1/2006 |
| JP | S60245525 A | 12/1985 |
| JP | 62-96955 U | 6/1987 |
| JP | S63 72515 A | 4/1988 |
| JP | 2001018229 A | 1/2001 |
| JP | 2003191063 A | 7/2003 |
| JP | 2006112628 A | 4/2006 |
| WO | 1998056562 A1 | 12/1998 |
| WO | 2011132220 A1 | 10/2011 |

OTHER PUBLICATIONS

International Search Report issued in corresponding international application No. PCT/DK2015/050138, dated Aug. 13, 2015.
Written Opinion of the International Search Authority issued in corresponding international application No. PCT/DK2015/050138, dated Aug. 13, 2015.
Supplementary European Search Report issued in corresponding application No. EP 15 79 9739, dated Oct. 25, 2017.
Lampl, A., "Wirtschaftliche Fertigung kleiner Serien von Gummiformteilen im Spritzgießverfahren", Kautschuk und Gummi Kunststoffe, Huthig, Verlag, Heidelberg, DE, vol. 42, No. 3, pp. 222-227, Mar. 1, 1989.
Notification for Reasons for Refusal, issued in corresponding Japanese application No. JP 2016-570004, dated Mar. 6, 2019.
Notification for Reasons for Refusal, issued in corresponding Japanese application No. JP 2016-570004, dated Mar. 6, 2019. (Computer generated English translation).
Original Office Action issued in corresponding Chinese application No. CN 201580028135.1, dated Jun. 21, 2019.
English language translation of Office Action issued in corresponding Chinese application No. CN 201580028135.1, dated Jun. 21, 2019.

\* cited by examiner

MOULD TOOL FOR INJECTION MOULDING

CROSS-REFERENCE TO RELATED APPLICATIONS

This application is a U.S. National Stage of International Application No. PCT/DK2015/050138, filed on 28 May 2015 and published on 3 Dec. 2015, as WO 2015/180735 A1, which claims the benefit of priority to Danish Patent Application No. PA 2014 70309, filed on 28 May 2014.

PRIOR ART

The present invention relates to an injection-moulding mould configured for being mounted in an injection-moulding apparatus for automated moulding of work pieces from plastics, said injection-moulding mould comprising at least two separate mould parts that are separated by a mould separation face, and wherein at least one mould part is configured with an outer frame in which one or more spaces is/are configured that are open relative to the mould separation face, in which is mounted at least one exchangeable mould insert, and wherein the exchangeable mould insert has a mould cavity side that faces towards the mould separation face, which mould cavity side is provided with one or more mould cavities, and wherein, in the mould insert, a set of cooling channels is provided and at least two pipe couplings to which there is, for each pipe coupling, configured a cooling pipe being, with its first end, mounted to the pipe coupling and extending therefrom, in its longitudinal direction, from the pipe coupling and out through a channel in the outer frame of the mould part and to its other end.

An injection-moulding mould of that type is known from U.S. Pat. No. 6,936,206, wherein the cooling channel is screwed into a side wall surface on the mould insert element and extends out through the passage on the frame of the mould part that encloses the mould insert element.

OBJECT OF THE INVENTION

Based on this, it is the object of the present invention to provide an injection-moulding mould of the kind set forth above, whereby further space is provided in the mould insert for cooling channels, mould cavities, etc., and wherein mounting and dismounting of cooling pipes are considerably facilitated.

This is accomplished by the invention as set forth in claim 1; the cooling pipe being secured against dismounting by axial shifting out of the pipe coupling on the mould insert, it is enabled to configure the pipe coupling such that it takes up very little volume in the mould insert to the effect that more space is thereby provided for mould cavities, cooling channels and other components important to the moulding process in the mould insert.

For instance, the pipe coupling can, in a simple manner, be constituted by a cylindrical hole in the mould insert, into which hole the cooling pipe is introduced, and wherein, on the first end of the cooling pipe, a first round-going recess is configured on the outer side of the cooling pipe, in which a gasket is provided, such as an O-ring, which abuts on the inner side of the cylindrical hole on the mould insert.

According to a preferred embodiment, the cooling pipe is secured in the channel by means of a ring-shaped mounting clip that has an outer periphery extending around the cooling pipe and being securely mounted on the inner side of the channel, and having a number of elastic tongues that extend slantingly inwards from the outer periphery towards the cooling pipe and in a direction towards the pipe coupling on the mould insert, and wherein each of the elastic tongues has a pin that engages with another round-going recess on the outer side of the cooling pipe to the effect that the cooling pipe can be shifted along its longitudinal axis only if the pins on the elastic tongues are caused to disengage from the other round-going recess on the cooling pipe.

Said mounting clip may advantageously be configured from a thermoplastic plastics material to the effect that it thermally insulates the cooling pipe from the inner side of the channel.

According to a particularly preferred embodiment, particularly easy and safe mounting and dismounting of the cooling pipes can be established. That embodiment thus comprises a mounting tool for release of the mounting clip, said mounting tool comprising a pipe end that can be shifted on the outside of the cooling pipe in a direction towards the mounting clip, and wherein the mounting tool has, at its opposite end relative to pipe end, a pressure face configured such that pipe end can be pressed into the channel on the outside of the cooling pipe, where it, by shifting past the outer periphery of the mounting clip, presses said elastic tongues outwards towards the inner side of the channel in such a manner that the pins on the elastic tongues are pushed out of the second round-going recess on the cooling pipe.

Advantageously, the mounting tool may further comprise a number of holes configured in the pipe end, wherein, in each hole, a ball is provided that can be shifted radially outwards from and inwards to a ball seat configured in the hole, wherein a part of the ball's surface extends within the inner side of the pipe end, and wherein the mounting tool further comprises an outer pipe that extends on the outside of the pipe end and can be shifted axially longitudinally of same, and wherein there is configured, in the outer pipe, a guide for each ball, which guide is configured such that each ball is, by shifting of the outer pipe in a direction relative to the pipe end, pushed inwards towards its ball seat, and, by shifting of the outer pipe in the opposite direction, allows the ball to move radially outwards and away from its ball seat, and wherein the holes are arranged such that, when pipe end is pushed so far onto the cooling pipe that the tongues on the mounting clip are pushed out of the second round-going recess on the cooling pipe, the balls may, by shifting of the outer pipe on pipe end, engage with a third round-going recess on the outer side of the cooling pipe, to the effect that the cooling pipe can be withdrawn from the channel by a pull being exerted in the mounting tool.

THE DRAWING

FIG. 1: is a sectional view through a part of an injection-moulding tool with a mould insert and a cooling pipe according to the invention.

Figure 2:
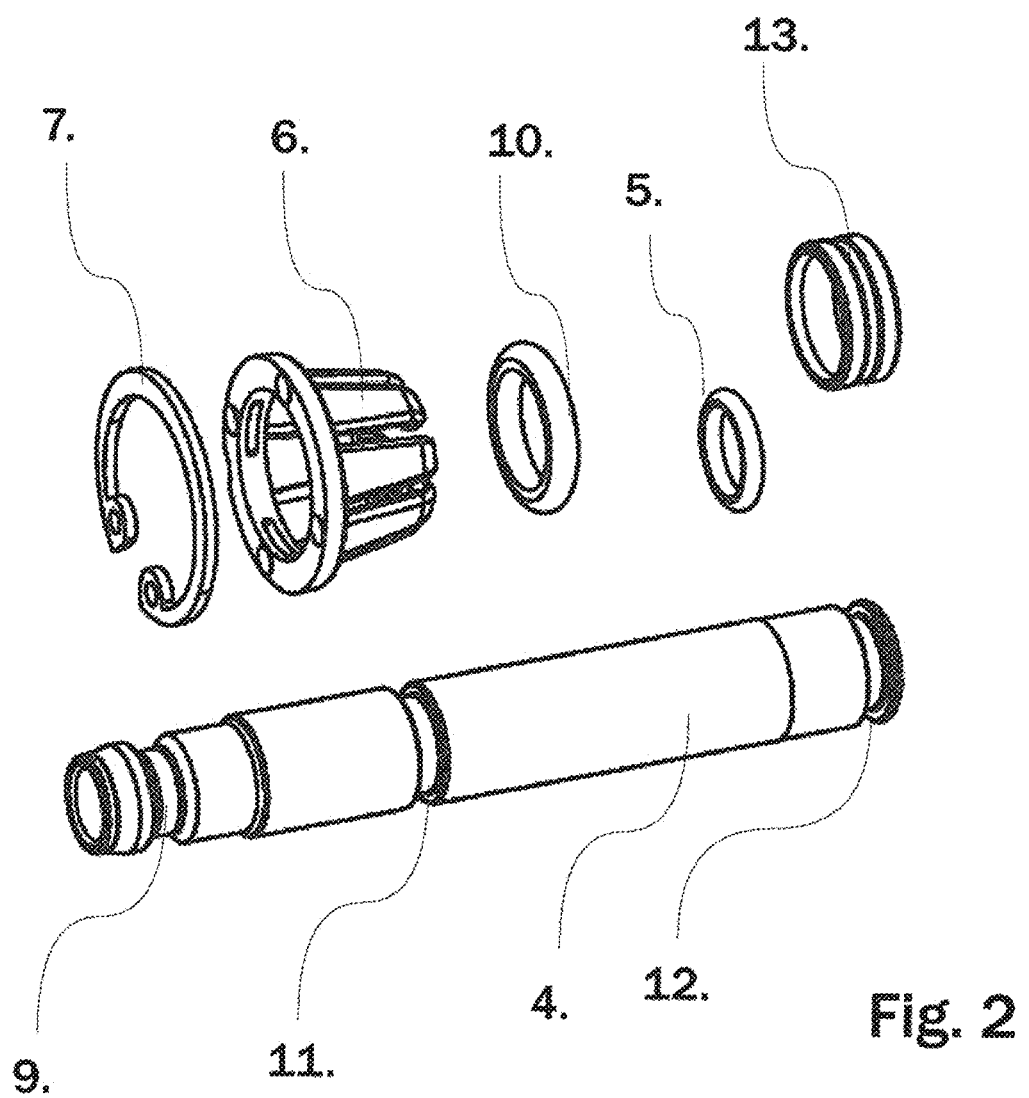

FIG. 2: is an exploded perspective view showing constituent components of the injection-moulding mould as shown in FIG. 1.

DESCRIPTION OF AN EMBODIMENT

Thus, FIG. 1 shows a part of an injection-moulding mould seen in a cut face, wherein a cooling pipe 4 is mounted in the injection-moulding mould. For the sake of overview, only a small portion of an injection-moulding mould is thus shown, viz the part that characterises the invention compared to commonly known injection-moulding moulds. In this context, it will be clear to the person skilled in the art that the remainder of the injection-moulding mould can be configured in a vast number of different embodiments; mould parts 1 with exchangeable inserts 3 being commonly known where, by standard tools, manufacture of different components in the same mould tool is desired, whereby it is thus avoided that the overall mould tool is to be exchanged when production is to be switched to the manufacture of a new work piece. By use of the exchangeable inserts, the switch from production of one work piece to another can often be accomplished merely by an exchange of the mould insert 3.

An example of a known mould tool of this type will thus appear from the above-referenced U.S. Pat. No. 6,936,206, wherein the cooling medium channel is screwed into a side wall surface on the mould insert element and extends out through the passage on the frame of the mould part that encloses the mould insert element.

Thus, from the drawing a mould insert 3 will appear which, by known means (not shown), is mounted in a mould part 1 comprising an outer frame 2 that encloses the periphery of the mould insert 3, of which only one side is shown in the figure.

Moreover, the mould insert 3 has one or more mould cavities (not shown) and a number of cooling channels 14, and with the purpose of supplying cooling water to the cooling channels 14 there is, according to the invention, mounted a cooling pipe 4 in a cooling coupling configured therefor in the cooling channel 14. In the shown embodiment, the pipe coupling is configured as a cylindrical hole which is provided with an annular lining 13 for the sake of ensuring an effective packing surface for the annular rubber gasket or so-called O-ring 5 shown in the drawing and being arranged in a first recess on the outside of the cooling pipe 4.

The cooling pipe 4 being moreover secured against axial displacement in the channel 8 by means of a mounting clip 6, it is possible to configure the pipe coupling such that it takes up only very little space in the mould insert 3, and hence more space becomes available to other functional parts in the mould insert 3, such as cooling channels, mould cavities, etc.

In FIG. 2, the cooling pipe and the mounting clip are shown, and so are the further components that it takes to establish the coupling of the cooling pipe 4 to the mould insert 3. From here it will appear that the mounting clip 6 has a plurality of tongues that each extends from the outer periphery of the mounting clip and slantingly forwards towards the pipe coupling on the mould insert 3 where, by means of a pin, it is capable of releasably engaging with another round-going recess 11 on the outer side of the cooling pipe 4.

The mounting clip 6 being secured in the channel 8 by means of the lock ring 7, this will mean that the cooling pipe 3 is thereby not displaceable in the longitudinal direction thereof, unless the elastic tongues on the mounting clip are caused to leave their engagement with the other round-going recess 11 on the cooling pipe 4.

To this end, the injection-moulding mould comprises a mounting tool 20, 24 which is shown in FIG. 1. That mounting tool 24 has a pipe end 22 that can be shifted on the outside of the cooling pipe 4 from the outside and so far onto it that the pipe end 22 can reach so far past the outer periphery of the mounting clip 6 that it can force the elastic tongues on the mounting clip 6 outwards towards the inner side of the channel 8. Thereby, the pin is pulled out of the second round-going recess 11 on the cooling pipe, and the cooling pipe can be pulled out freely, apart from the friction between the pipe coupling on the insert and the O-ring 5 on the cooling pipe 4.

Moreover, the mounting tool 24 has a ball coupling functionality that comprises a number of balls 23 that are each arranged in a hole configured with a ball seat and configured in the pipe end. Here, the ball seat serves the function that the balls 23 cannot fall in on the inner side of the pipe end 22, but can only be moved so far inwards towards the centre axis of the pipe end 22 where it is capable of engaging with the third round-going recess 9 on the cooling pipe 4 and, in that position, seizing it to the effect that the mounting tool 24 can be used both to insert and withdraw the cooling pipe 4 into and from the channel 8. To be able to move balls out of and into, respectively, engagement with the recess 9 on the cooling pipe 4, the mounting tool 24 further comprises an outer pipe 21 that extends on the outside of the pipe end 22 and can be shifted axially longitudinally thereof 22, and wherein, in the outer pipe 21, a guide is provided for each ball 21, which guide is configured such that each ball 21 is, by shifting of the outer pipe 21 in a direction relative to the pipe end 22, pushed inwards towards its ball seat; and reversely, when the outer pipe 21 is shifted in the opposite direction, the ball 23 is allowed to move radially outwards and away from its ball seat. To the above end, the holes are arranged such that, when the pipe end 22 is pushed so far onto the cooling pipe 4 that the tongues on the mounting clip 6 are pushed out of the second round-going recess 9 on the cooling pipe 4, the balls 23 can, by shifting of the outer pipe 21 on the pipe end, enter into engagement with the third annular recess on the outer side of the cooling pipe, to the effect that the cooling pipe 4 can be pulled out of the channel 8 by a pull being exerted in the mounting tool 24.

To keep the outer pipe 21 and pipe end 22 at a mutual position wherein the balls are locked in each their ball seat, a spring 25 is configured that displaces the two parts 21, 22 in the direction by which the locking thereof appears.

The invention claimed is:

1. An injection-moulding mould configured for being mounted in an injection-moulding apparatus for automated moulding of work pieces from plastics, the injection-moulding mould comprising:
a male mould part and a female mould part;
wherein the male mould part comprises:
an outer frame configured to mount to a mould insert,
one or more cooling channels,
a cooling pipe extending through the one or more cooling channels and connected to at least one pipe coupling at one end thereof; and
a ring-shaped mounting clip extending around the cooling pipe and being securely mounted on the inner side of the one or more cooling channels, the mounting clip having a number of elastic tongues that extend slantingly inwards from the outer periphery to a first recess on the cooling pipe and in a direction towards the pipe coupling to secure the cooling pipe in the one or more cooling channels such that the cooling pipe can be shifted along its longitudinal axis only if the elastic tongues are caused to disengage from the cooling pipe;
wherein the female mould part comprises:
a pipe end that can be pressed into the one or more cooling channels and shifted on the outside of the cooling pipe in a direction towards the mounting clip, thereby pressing the elastic tongues outwards towards an inner side of the channel such that the elastic tongues are disengaged from the cooling pipe;

an outer pipe that extends on the outside of the pipe end and can be shifted axially longitudinally of same;

a number of balls on the pipe end, wherein each ball can be pushed inward towards the ball seat by shifting the outer pipe in a direction relative to the pipe end, and moved radially outwards and away from its ball seat by shifting the outer pipe in the opposite direction;

wherein the pipe end can be pushed onto the cooling pipe in the channel such that the balls engage with a second recess of the cooling pipe and the elastic tongues on the mounting clip are pushed out of the first recess and away from the cooling pipe so that the cooling pipe can be withdrawn from the channel.

2. An injection-moulding mould according to claim 1, characterised in that the pipe coupling is constituted by a cylindrical hole in the mould insert, into which hole the cooling pipe is introduced, and wherein, on the first end of the cooling pipe, a first round-going recess is configured on the outer side of the cooling pipe, in which a gasket is provided, which abuts on the inner side of the cylindrical hole on the mould insert.

3. An injection-moulding mould according to claim 1, wherein each of the elastic tongues has a pin that engages with another round-going recess on the outer side of the cooling pipe to the effect that the cooling pipe can be shifted along its longitudinal axis only if the pins on the elastic tongues are caused to disengage from the other round-going recess on the cooling pipe.

4. An injection-moulding mould according to claim 3, characterised in that the mounting clip is made from a thermoplastic plastics material.

5. An injection-moulding mould according to claim 3, wherein the female mould part has, at its opposite end relative to pipe end, a pressure face configured such that pipe end can be pressed into the channel on the outside of the cooling pipe, where it, by shifting past the outer periphery of the mounting clip, presses said elastic tongues outwards towards the inner side of the channel in such a manner that the pins on the elastic tongues are pushed out of a second round-going recess on the cooling pipe.

6. An injection-moulding mould according to claim 5, wherein the female mould part further comprises a number of holes configured in the pipe end in which one of the balls is provided, wherein a part of the ball's surface extends within the inner side of the pipe end, and wherein the female mould part further comprises an outer pipe that extends on the outside of the pipe end and can be shifted axially longitudinally of same, and wherein there is configured, in the outer pipe, a guide for each ball.

* * * * *